US008134664B2

(12) United States Patent
Kajita et al.

(10) Patent No.: US 8,134,664 B2
(45) Date of Patent: Mar. 13, 2012

(54) LIQUID CRYSTAL DISPLAY DEVICE

(75) Inventors: Daisuke Kajita, Hitachi (JP); Ikuo Hiyama, Hitachinaka (JP); Shintaro Takeda, Hitachi (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 990 days.

(21) Appl. No.: 12/019,708

(22) Filed: Jan. 25, 2008

(65) Prior Publication Data
US 2008/0192183 A1 Aug. 14, 2008

(30) Foreign Application Priority Data

Feb. 9, 2007 (JP) ................................ 2007-029939

(51) Int. Cl.
G02F 1/1335 (2006.01)
G02F 1/1343 (2006.01)
(52) U.S. Cl. ........................... 349/117; 349/96; 349/141
(58) Field of Classification Search ...................... 349/96
See application file for complete search history.

(56) References Cited

U.S. PATENT DOCUMENTS

| 6,411,357 | B1 * | 6/2002 | Ting et al. ....................... 349/141 |
| 7,405,785 | B2 * | 7/2008 | Nishida et al. .................. 349/117 |
| 2005/0206817 | A1 * | 9/2005 | Kajita et al. .................... 349/119 |
| 2006/0246231 | A1 * | 11/2006 | Koishi et al. ..................... 428/1.3 |
| 2007/0091228 | A1 * | 4/2007 | Itadani et al. ..................... 349/96 |

FOREIGN PATENT DOCUMENTS

| EP | 1 715 375 | 10/2006 |
| JP | 11-133413 | 5/1999 |
| JP | 2005-202383 | 7/2005 |
| JP | 2006-003840 | 1/2006 |

OTHER PUBLICATIONS

H. J. Coles and M. N. Pivnenko, "Liquid crystal blue-phases with a wide temperature range", Nature, vol. 436, pp. 997-1000 (Aug. 2005).
B. R. Acharya, et al., "The Bent-Core Biaxial Nematic Phase", Liquid Crystals Today, vol. 13. No. 1, pp. 1-4 (Mar. 2004).
D. W. Berreman, "Optical in Stratified and Anisotropic Media: 4×4-Matrix Formulation" J. Opt. Soc. Am. vol. 62, No. 4, pp. 502-510, Apr. 1972.
Office Action in JP 2007-029939, dated Jul. 29, 2011 [in Japanese, 3 pgs.] including partial English language translation of the Office Action.

* cited by examiner

Primary Examiner — Mark Robinson
Assistant Examiner — Charles Chang
(74) Attorney, Agent, or Firm — Antonelli, Terry, Stout & Kraus, LLP.

(57) ABSTRACT

The liquid crystal display device according to this invention comprises: a first substrate having a first polarization layer on a light incident side; a second substrate having a second polarization layer on a light outgoing side; a first birefringent medium disposed between the first polarization layer and the liquid crystal layer; a second birefringent medium disposed between the second polarization layer and the liquid crystal layer; a pixel electrode and a common electrode arranged on one of the first substrate and the second substrate; wherein an absorbing axis of the first polarization layer and an absorbing axis of the second polarization layer form an angle of from 88 degrees to 92 degrees; wherein the liquid crystal layer has a property that an in-plane refractive index anisotropy is induced in the liquid crystal layer by an electric field produced by the pixel electrode and the common electrode.

6 Claims, 21 Drawing Sheets $S1 = \cos La \cos Lo$
$S2 = \cos La \sin Lo$
$S3 = \sin La$ $S1 = \langle |Ex|^2 \rangle - \langle |Ey|^2 \rangle$
$S2 = \langle 2ExEy\cos\delta \rangle$
$S3 = \langle 2ExEy\sin\delta \rangle$
$\delta = \phi y - \phi x$

LIQUID CRYSTAL DISPLAY DEVICE

BACKGROUND OF THE INVENTION

The present invention relates to a liquid crystal display device and a liquid crystal panel and more specifically to significant improvements in a viewing angle characteristic of the liquid crystal display device that controls transmission and cutoff of light by applying an electric field to a liquid crystal layer having two-dimensional optical isotropy.

Among liquid crystal display methods to improve contrast and viewing angle characteristic of a twisted nematic (TN) display system, there have been known an in-plane switching (horizontal electric field) display method (hereinafter referred to as an "IPS method") and a multi-domain vertical alignment display method (hereinafter referred to as a "VA method"). These methods are able to make substantial improvements in viewing angle and contrast over the TN display method.

However, in the IPS and VA methods since the liquid crystal layer is an optically uniaxial medium, if it is used as is, its transmissivity will have a dependency on the viewing angle. Further, the nematic liquid crystal material exhibits light scattering caused by thermal fluctuations of their molecules. In the IPS and VA methods the nematic liquid crystal material enters a black mode when applied with no voltage. So even in the black mode, degradations in contrast due to light leakage caused by scattering are theoretically unavoidable. These problems of optical anisotropy and light scattering are unique to the display devices using the nematic liquid crystal material.

Under these circumstances, a liquid crystal material with an optically three- or two-dimensional isotropy (hereinafter referred to as an "isotropic liquid crystal") has come to be known in recent years. This isotropic liquid crystal exhibits a characteristics that, when no voltage is applied to the liquid crystal layer, the alignment of the liquid crystal molecules is optically three- or two-dimensionally isotropic and that when a voltage is applied, a birefringence is induced in the voltage application direction. Isotropic liquid crystal materials reported in recent years that have three-dimensional isotropy are smectic blue phase and cholesteric blue phase liquid crystals. Isotropic liquid crystal materials with two-dimensional isotropy are bent type liquid crystal molecules having a so-called bent-core structure. The bent-core structure means a liquid crystal compound aligned vertical to a substrate and exhibits an isotropy in a plane of the liquid crystal layer when no voltage is applied. Other liquid crystal materials known include cubic phase, smectic Q phase, micellar phase, reverse micellar phase and sponge phase liquid crystals.

H. J. Coles and M. N. Pivnenko, Nature, Vol. 436, pp. 997-1000 (2005), describes an increased temperature range of the blue phase which has been very narrow in temperature range and difficult to put into practical use with devices. B. R. Acharya, et al., Liquid Crystals Today, Vol. 13. No. 1, pp. 1-4 (2004), describe isotropic liquid crystal materials and their properties in connection with an optical biaxiality of the bent-core structure.

Further JP-A-2006-3840 discloses detailed electrode structures of liquid crystal panels using isotropic liquid crystals.

SUMMARY OF THE INVENTION

As described above, the isotropic liquid crystals have come to be known to have properties different from those of conventional liquid crystals. The above-cited publications, however, do not consider a problem of viewing angle characteristic that may arise when the two-dimensional optically isotropic liquid crystals are actually applied to display devices.

Our studies have found that an application of the two-dimensional optically isotropic liquid crystals to display devices gives rise to the following problems although it has advantages in terms of image quality such as a good contrast ratio (hereinafter referred to as a CR ratio) when viewed from the front and a good viewing angle characteristic at high grayscale levels. The problems include a significant light leakage when viewed at an oblique angle during the black mode, which in turn results in a reduction in CR ratio when viewed at an oblique angle and a deteriorated color reproduction at low grayscale levels when viewed at an oblique angle.

A problem this invention intends to solve is that, in a liquid crystal display device that applies an electric field to a liquid crystal layer having a two-dimensional optical isotropy to control light transmission and cutoff, the brightness increases when the liquid crystal display is viewed at an oblique angle in the black mode.

To solve the above problem, the following means are employed.

According to one aspect of the present invention, there is provided a liquid crystal display device which comprises a first substrate having a first polarization layer on a light incident side; a second substrate having a second polarization layer on a light outgoing side; a first birefringent medium disposed between the first polarization layer and the liquid crystal layer; a second birefringent medium disposed between the second polarization layer and the liquid crystal layer; a pixel electrode and a common electrode arranged on one of the first substrate and the second substrate; wherein an absorbing axis of the first polarization layer and an absorbing axis of the second polarization layer form an angle of from 88 degrees to 92 degrees; wherein the liquid crystal layer has a property that enables an in-plane refractive index anisotropy to be induced in the liquid crystal layer by an electric field produced by the pixel electrode and the common electrode.

The "angle of from 88 degrees to 92 degrees" is intended to mean that the directions of the two axes are almost at right angle. That is, ±2 degrees is taken as an error range for the angle in which the effects of this invention are considered achievable. Further, the liquid crystal layer is mainly composed of optically biaxial liquid crystal molecules. The expression "a property that enables an in-plane refractive index anisotropy to be induced in the liquid crystal layer by an electric field" is intended to mean a property of the liquid crystal layer that, when applied an electric field, produces an optical anisotropy in a plane parallel to the first and second substrates from a state where the refractive indices of the liquid crystal layer are equal (i.e., optically isotropic in two dimensions).

In the above construction, the liquid crystal layer, when not applied an electric field, has a smaller refractive index in a direction parallel to the first and second substrates than a refractive index in a direction perpendicular to the first and second substrates; the first birefringent medium has an Nz coefficient of not less than 1; a retarded phase axis in a plane parallel to the first and second substrates forms an angle of from 88 degrees to 92 degrees with the absorbing axis of the first polarization layer; the second birefringent medium has an Nz coefficient of not less than 1; and the retarded phase axis in a plane parallel to the first and second substrates forms an angle of from 88 degrees to 92 degrees with the absorbing axis of the second polarization layer.

Further, the liquid crystal layer, when not applied an electric field, has a larger refractive index in a direction parallel to the first and second substrates than a refractive index in a direction perpendicular to the first and second substrates; the first birefringent medium has an Nz coefficient of not larger than 0; a retarded phase axis in a plane parallel to the first and second substrates forms an angle of from 88 degrees to 92 degrees with the absorbing axis of the first polarization layer; the second birefringent medium has an Nz coefficient of not larger than 0; and a retarded phase axis in a plane parallel to the first and second substrates forms an angle of from 88 degrees to 92 degrees with the absorbing axis of the second polarization layer.

Further, the liquid crystal layer, when not applied an electric field, has a smaller refractive index in a direction parallel to the first and second substrates than a refractive index in a direction perpendicular to the first and second substrates; the first birefringent medium has an Nz coefficient of not less than 5; the second birefringent medium has an Nz coefficient of not less than 1; and a retarded phase axis in a plane parallel to the first and second substrates forms an angle of from 88 degrees to 92 degrees with the absorbing axis of the second polarization layer.

Further, the liquid crystal layer, when not applied an electric field, has a smaller refractive index in a direction parallel to the first and second substrates than a refractive index in a direction perpendicular to the first and second substrates; the first birefringent medium has an Nz coefficient of not less than 1; a retarded phase axis in a plane parallel to the first and second substrates forms an angle of from 88 degrees to 92 degrees with the absorbing axis of the second polarization layer; and the second birefringent medium has an Nz coefficient of not less than 5.

Further, the liquid crystal layer, when not applied an electric field, has a larger refractive index in a direction parallel to the first and second substrates than a refractive index in a direction perpendicular to the first and second substrates; the first birefringent medium has an Nz coefficient of not larger than −5; the second birefringent medium has an Nz coefficient of not larger than 0; and a retarded phase axis in a plane parallel to the first and second substrates forms an angle of from 88 degrees to 92 degrees with the absorbing axis of the second polarization layer.

Further, the liquid crystal layer, when not applied an electric field, has a larger refractive index in a direction parallel to the first and second substrates than a refractive index in a direction perpendicular to the first and second substrates; the first birefringent medium has an Nz coefficient of not larger than 0; a retarded phase axis in a plane parallel to the first and second substrates forms an angle of from 88 degrees to 92 degrees with the absorbing axis of the first polarization layer; and the second birefringent medium has an Nz coefficient of not larger than −5.

With the present invention, it is possible to realize a brightness reduction at an oblique viewing angle during black mode. This in turn allows for the realization of a liquid crystal display device which has a high CR ratio when viewed from the front, an improved tonality when viewed at an oblique viewing angle and a high CR ratio when viewed at an oblique viewing angle.

Other objects, features and advantages of the invention will become apparent from the following description of the embodiments of the invention taken in conjunction with the accompanying drawings.

DETAILED DESCRIPTION OF THE EMBODIMENTS

The present invention will be described in detail. In the explanation that follows, it is assumed that typical bent type liquid crystal molecules are used for a liquid crystal layer having two-dimensional optical isotropy. If birefringence of the liquid crystal layer matches the following explanation, the effects of this invention can be realized.

In a non-selfluminous liquid crystal display used in liquid crystal televisions that are becoming increasingly popular, it is important to pass as much light from an illuminating device or backlight assembly during a white mode and to cut off as much light in a black mode as possible. This invention in particular concerns a reduction in luminance of the liquid crystal display when viewed at an oblique angle in a black mode.

First, a factor that causes an increase in brightness when a liquid crystal panel is seen at an oblique angle during a black mode, will be explained.

Figure 2:
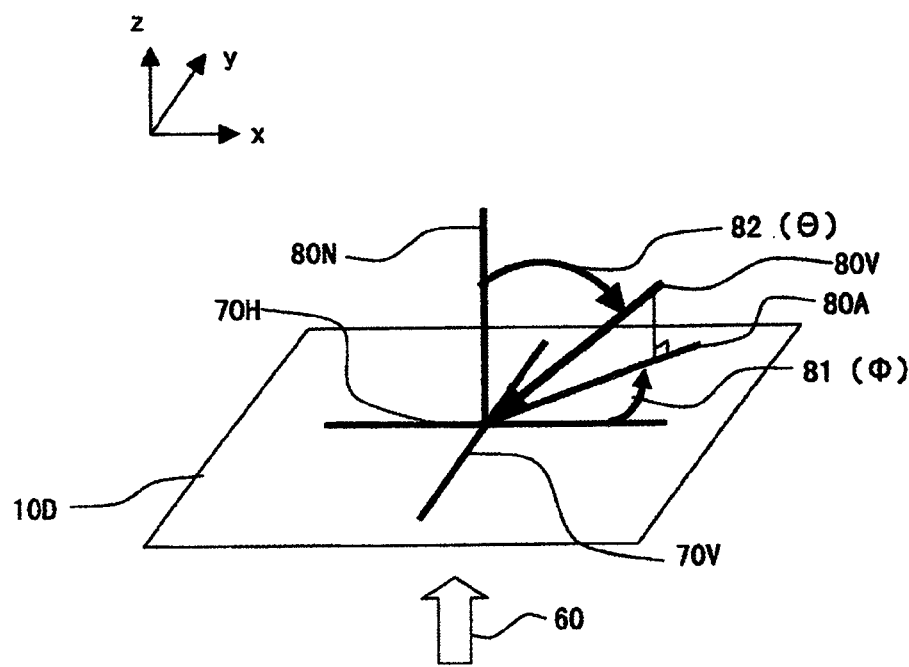
FIG. 2 is a definition diagram for explanation of the liquid crystal display device of this invention.

FIG. 2 shows a definition of a coordinate system. When a beam of light 60 emitted from an illumination device passes through the liquid crystal panel, the beam is modulated by a liquid crystal. The modulated beam as it leaves a display surface 10D is defined in the coordinated system as follows. A direction normal to the display surface 10D is designated 80N, a horizontal direction on the display surface 70H, a vertical direction on the display surface 70V and a viewing direction 80V. Also let a viewing angle 82 be θ and a projected direction on the display surface 10D of the viewing direction 80V be 80A. An angle formed by the projected viewing direction 80A and the horizontal direction on the display surface 70H is taken as an azimuth angle 81 and represented by Φ. Unless otherwise specifically stated, the xyz coordinates are set as shown in the figure.

Figure 3A:
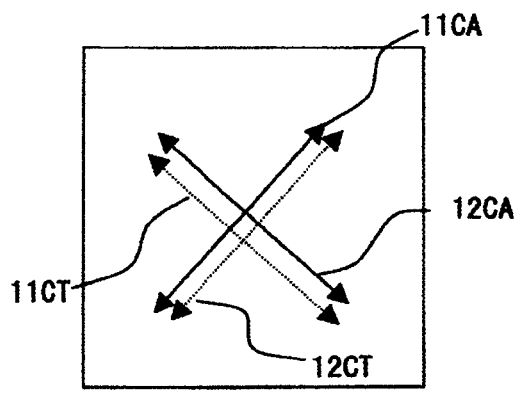
FIG. 3A is a conceptual diagram for explanation of the liquid crystal display device of this invention.
Figure 3B:
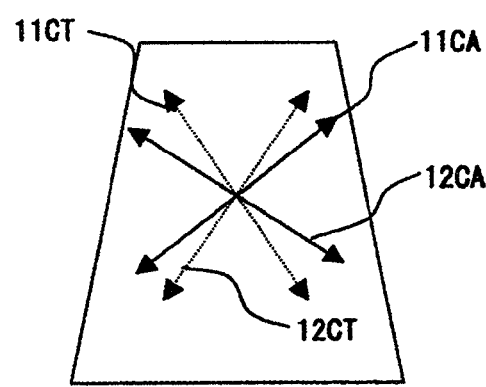
FIG. 3B is another conceptual diagram for explanation of the liquid crystal display device of this invention.

Next, in a pair of orthogonal polarizing plates, the causes for light leakage will be discussed by assuming that the viewing angle θ and the azimuth angle Φ are θ≠0° and Φ≠0°, 180°, ±90°. As shown in FIG. 3A, with absorbing axes 11CA, 12CA (or transmission axes 11CT, 12CT) of two polarizing plates set perpendicular to each other, an incident light from a direction normal to the polarizing plates is linearly polarized by a polarizing plate on the incident side and is absorbed by a polarizing plate on the outgoing light side to enable a black mode. When the liquid crystal panel is viewed at an oblique angle, as shown in FIG. 3B (θ≠0°, Φ≠0°, 180°, ±90°), the light has a component parallel to the transmission axis of the opposite polarizing plate and thus cannot be cut off completely by the opposite polarizing plate, resulting in a light leakage. Further, if a birefringent liquid crystal layer is disposed between the two polarization plates that are arranged perpendicular to each other, a polarization state change caused by the liquid crystal layer cannot be ignored.

For understanding of these phenomena, the Poincare sphere representation is very useful. The Poincare sphere is disclosed in, for example, "Crystal Optics" compiled by the Society of Applied Physics, Optics Meeting and published by Morikita Shuppan K. K., 1984, 4th impression of 1st edition, 5th chapter pp. 102-163. Stokes parameters S0, S1, S2, S3 are expressed in the following equations, where x and y axes are on a plane perpendicular to the direction of light, Ex and Ey are the electric field amplitudes of light, and $\delta$ ($=\delta y-\delta x$) is a relative phase difference between Ex and Ey.

$$S0=<|Ex|^2>+<|Ey|^2>$$

$$S1=<|Ex|^2>-<|Ey|^2>$$

$$S2=<2Ex\cdot Ey\cdot \cos \delta>$$

$$S3=<2Ex\cdot Ey\cdot \sin \delta> \quad (1)$$

Figure 4:
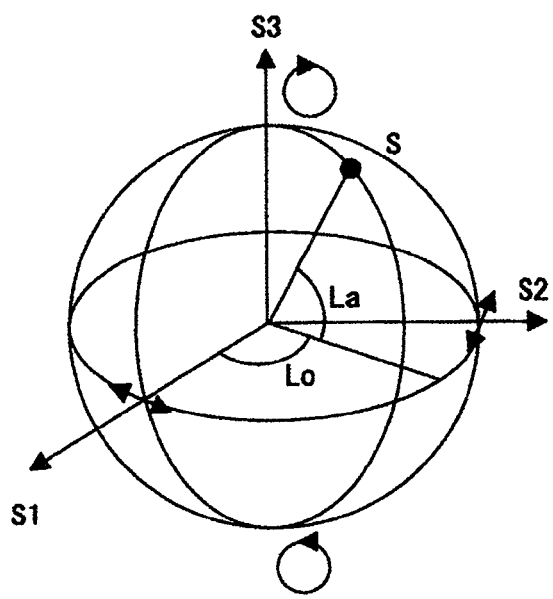
FIG. 4 is a general Poincare sphere representation for explanation of the liquid crystal display device of this invention.

In the case of complete polarization, these parameters have the following relationship: $S0^2=S1^2+S2^2+S3^2$. When represented on the Poincare sphere, they are as shown in FIG. 4. The parameters S1, S2, S3 are put on respective axes of a spatial orthogonal coordinate system and a point S representing the state of polarization is situated on a sphere with a radius of intensity S0. If a point of polarization state S is expressed by a latitude La and a longitude Lo, since $S0^2=S1^2+S2^2+S3^2$ in the case of complete polarization, the parameters can be expressed as follows by considering a sphere with a radius of 1.

$$S1=\cos La\cdot \cos Lo$$

$$S2=\cos La\cdot \sin Lo$$

$$S3=\cos La \quad (2)$$

Here, on the Poincare sphere, a clockwise polarization is arranged in an upper hemisphere, a counterclockwise polarization in a lower hemisphere, a linear polarization on the equator, and right- and left-handed circular polarizations in the north and south poles, respectively.

Figure 5A:
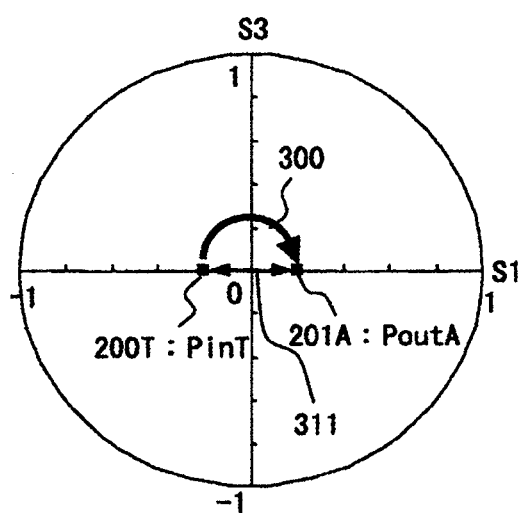
FIG. 5A is a Poincare sphere representation for explanation of the liquid crystal display device of this invention.
Figure 5B:
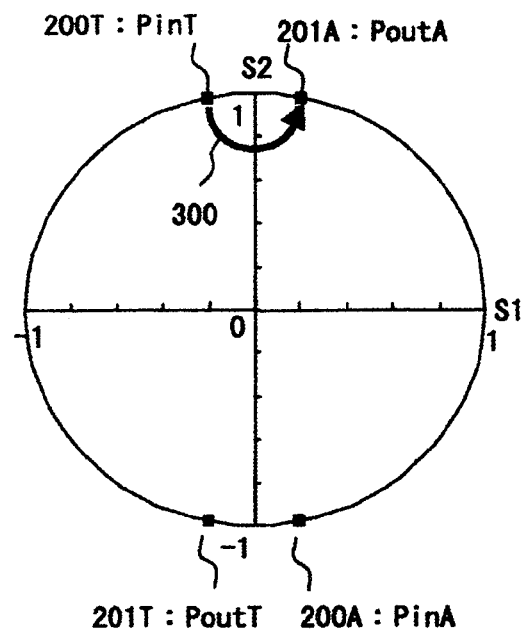
FIG. 5B is a Poincare sphere representation for explanation of the liquid crystal display device of this invention.

If we consider the states of FIGS. 3A and 3B on the Poincare sphere, they are represented as shown in FIGS. 5A and 5B. For an azimuth angle Φ=45° and θ=60°, FIG. 5B shows a projection of the direction onto a S1-S2 plane and FIG. 5A shows a projection onto a S1-S3 plane. The polarization state of the transmission axis 12CT of the light incident side polarization plate is represented by 200T; the linear polarization having a polarization component on the absorbing axis 12CA is represented by 200A; the polarization state of the transmission axis 11CT of the light outgoing side polarization plate is represented by 201T; and the linear polarization having a polarization component on the absorbing axis 11CA is represented by 201A. That is, a distance 311 between 200T and 201A indicates a light leakage. Therefore, the light leakage can be eliminated by performing a transformation 300 of the polarization state of 200T into that of 201A.

Any change in polarization state on the Poincare sphere can be represented by the rotary transformation about a certain axis on the equator. Our study has found that a change in polarization state on the Poincare sphere before and after the transmission through a general 2-axis anisotropic medium with its refractive indices nx, ny, nz in xyz directions all differing from one another is determined by a retardation Δnd (nx, ny, nz, φ, θ) when viewed at an oblique angle and by a coefficient Nz. The retardation Δnd (nx, ny, nz, φ, θ) when viewed at an oblique angle determines a rotation angle of the rotary transformation, and the coefficient Nz determines the rotation axis. The coefficient Nz is expressed by the following equation.

$$Nz=(nx-nz)/(nx-ny) \quad (3)$$

Figure 1:
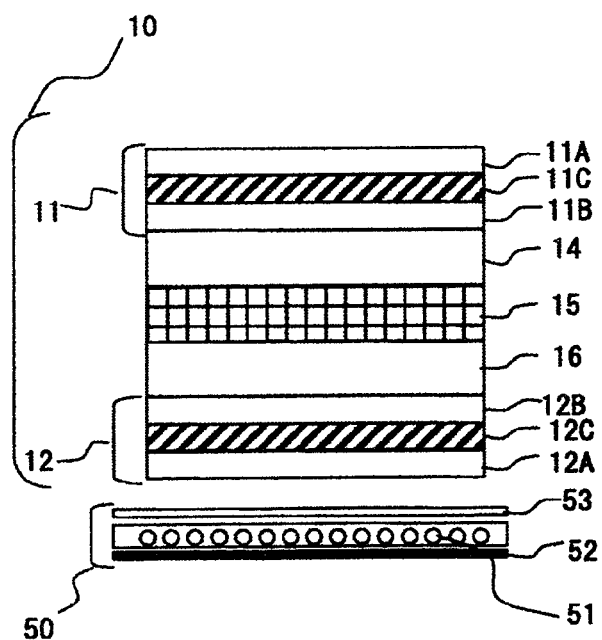
FIG. 1 shows a construction of a liquid crystal display device as one embodiment of this invention.

FIG. 1 shows a basic construction of a liquid crystal display device.

The liquid crystal display device has a first substrate 16 having a first polarization layer 12C on the light incident side, and a second substrate 14 having a second polarization layer 11C on the light outgoing side. Here, the absorbing axes of the first and second substrate are arranged almost at right angles to each other (with a smaller angle being 88-90°).

On both sides of the first polarization layer 12C there are arranged support members 12A, 12B, together forming a first polarization plate 12. Similarly, on both sides of a second polarization layer 11C are arranged support members 11A, 11B, together forming a second polarization plate 11.

Between the first substrate 16 and the second substrate 14, a liquid crystal layer 15 is arranged. The liquid crystal layer 15 is perpendicularly aligned to the first substrate 16 and the second substrate 14 when the bent type liquid crystal molecules are not applied with a voltage. Near the blue phase liquid crystal layer 15 of at least one of the first substrate 16 and the second substrate 14, a group of matrix-driven electrodes having at least a pair of electrodes facing each pixel is provided. The electrodes can apply a horizontal electric field to the liquid crystal layer 15. The structure ranging from the first polarization plate 12 to the second polarization plate 11 is referred to as a liquid crystal display element 10. At the back of the liquid crystal display element 10, an illumination device 50 is arranged. The illumination device 50 comprises lamps 51, a reflection plate 52 for reflecting light from the lamps and a diffusion plate 53 that diffuses light thrown from the lamps onto the liquid crystal display element 10.

Figure 28:
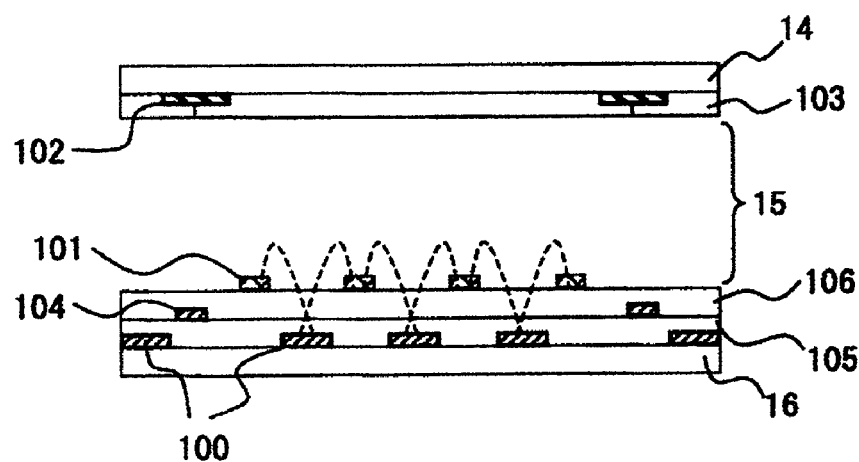
FIG. 28 shows a construction of a liquid crystal display device as one embodiment of this invention.
Figure 29:
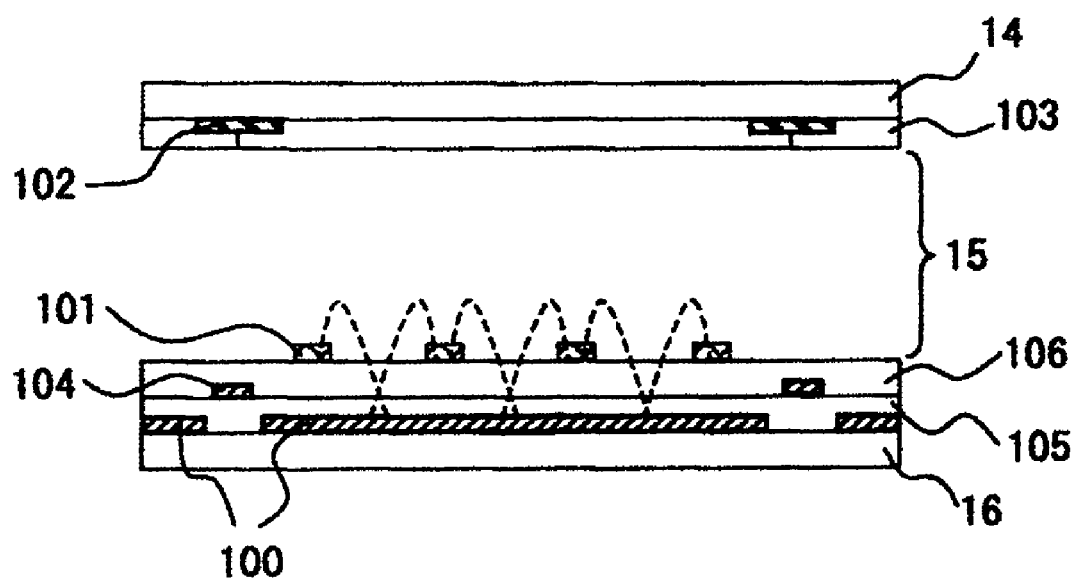
FIG. 29 shows a construction of a liquid crystal display device as one embodiment of this invention.

FIG. 28 and FIG. 29 show an example of detailed structure between the first substrate 16 and the second substrate 14 in FIG. 1.

In FIG. 28, a comb-shaped common electrode 100 is arranged on the first substrate 16, over which video signal lines 104 are disposed through an insulating film 105. Over the video signal lines 104 a comb-shaped pixel electrode 101 is disposed with a protective film 106 in between. On the second substrate 14 there are arranged color filters 103, one for each pixel, with a black matrix 102 arranged to separate individual pixels.

A potential difference between the common electrode 100 and the pixel electrode 101 is used to apply an electric field to the liquid crystal layer 15 to control a transmissivity.

FIG. 29 differs from the structure of FIG. 28 in that the common electrode 100 is formed in a tabular shape. For the common electrode 100, a transparent electrode is used. This construction can improve an aperture ratio compared with the construction of FIG. 28.

In the structure of FIG. 1, to cause an ideal polarization state change shown in FIGS. 5A and 5B, the support member 12B disposed between the first polarization layer 12C and the liquid crystal layer 15 and the support member 11B disposed between the second polarization layer 11C and the liquid crystal layer 15 need to be formed of a birefringent medium. Further, considering the manufacturing cost of the polarization plates, the support member 11B and the support member 12B are preferably identical.

The birefringence required to the polarization plate support members 11B and 12B is determined by the birefringence of the liquid crystal layer 15 during black mode. If the bent type liquid crystal molecules are perpendicularly aligned, with no voltage and no horizontal alignment restricting force applied, the liquid crystal layer 15 has no birefringence in the x-y plane and exhibits retardation when viewed at an oblique angle. That is, in terms of refractive indices in the xyz directions, the liquid crystal layer in black mode satisfies either $nx=ny\geq nz$ or $nz\geq nx=ny$. Selection of the bent type liquid crystal molecules makes it possible to choose between them.

Figure 6:
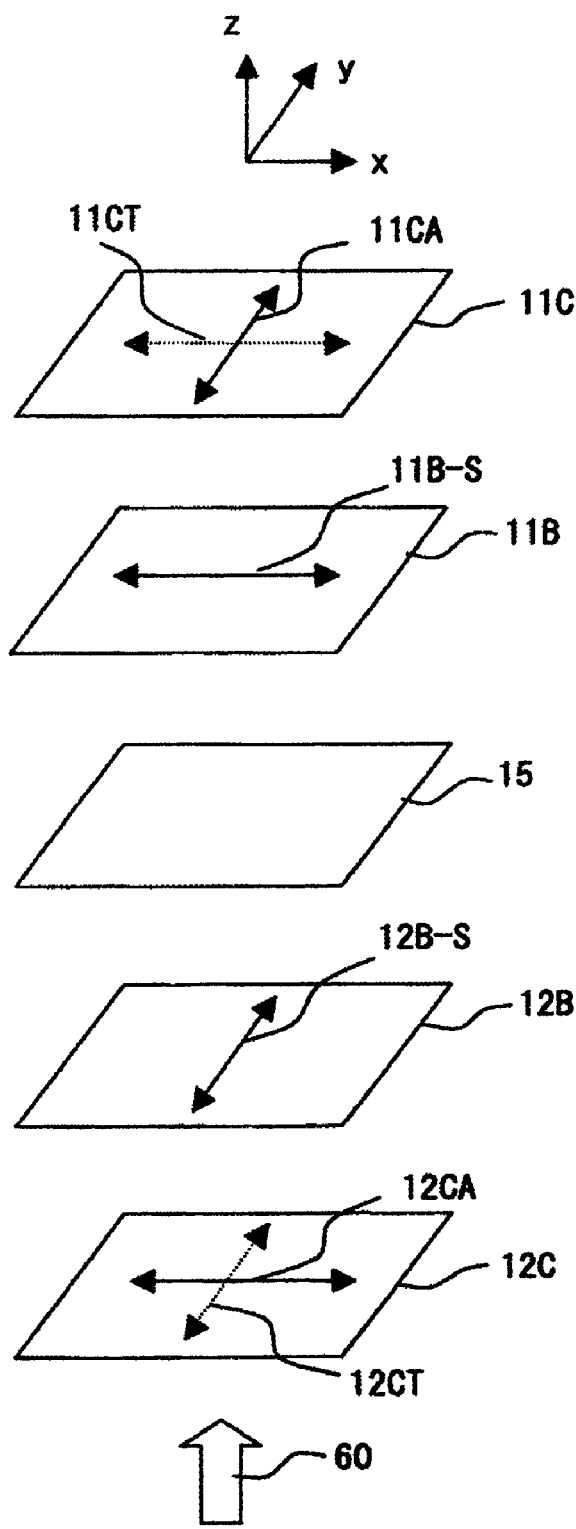
FIG. 6 is an optical configuration diagram for the liquid crystal display device of this invention.
Figure 7A:
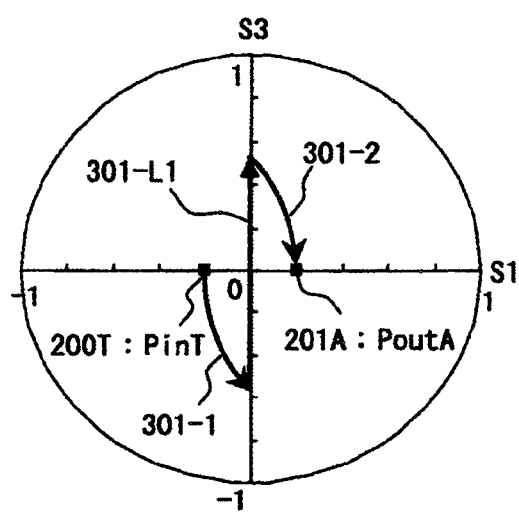
FIG. 7A is a Poincare sphere representation for explanation of the liquid crystal display device of this invention.
Figure 7B:
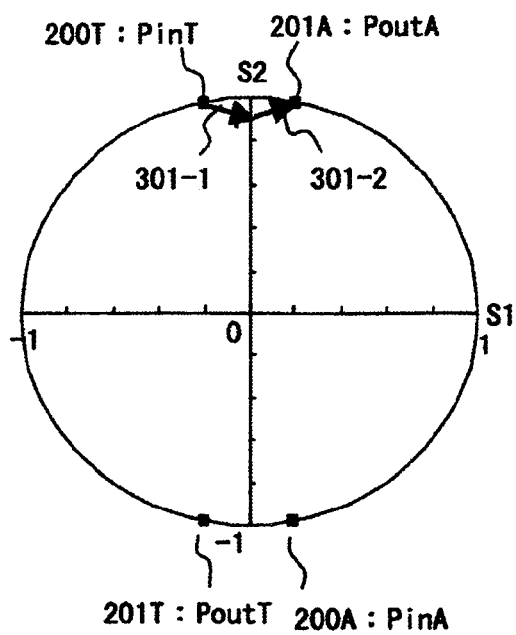
FIG. 7B is a Poincare sphere representation for explanation of the liquid crystal display device of this invention.

If the liquid crystal layer during black mode satisfies $nz\geq nx=ny$, for an ideal polarization state change in the construction of FIG. 1, the optical configuration of FIG. 6 needs to be satisfied and the Nz coefficients of the polarization plate support members 11B and 12B need to be greater than at least 0. In FIG. 6, 11B-S and 12B-S represent retarded phase axes in substrate parallel planes of the polarization plate support members 11B and 12B on the liquid crystal layer side. In this case, the rotary axis on the Poincare sphere for the polarization plate support member 11B is to the right side of 200T in FIGS. 5A and 5B and the rotary axis on the Poincare sphere for the polarization plate support member 12B is to the left side of 201A in FIGS. 5A and 5B. Thus a polarization state change such as shown in FIGS. 7A and 7B is possible. As can be guessed from these figures, a case where the polarization state change shown in FIGS. 7A and 7B can be realized with an Nz coefficient of the polarization plate support member 11B or 12B of 0.1, for example, is when the retardation of the liquid crystal layer 15 at an oblique viewing angle is small. Considering the fact that during white mode a sufficient transmissivity is obtained at the front and that a difference among refractive indices nx, ny, nz of the liquid crystal layer is normally about 0.1 at most, the Nz coefficients of the polarization plate support members 11B and 12B are generally considered to be 1 or larger. The Nz coefficients of the polarization plate support members 11B and 12B are determined by the refractive index and the thickness of the liquid crystal layer during black mode. In FIGS. 7A and 7B, 301-1 and 301-2 represent polarization state changes caused by the polarization plate support members 11B and 12B, and 301-L1 represents polarization state change by the liquid crystal layer 15. The polarization state change shown in FIGS. 7A and 7B reduces light leakage at an oblique viewing angle during black mode, as described earlier.

Figure 8:
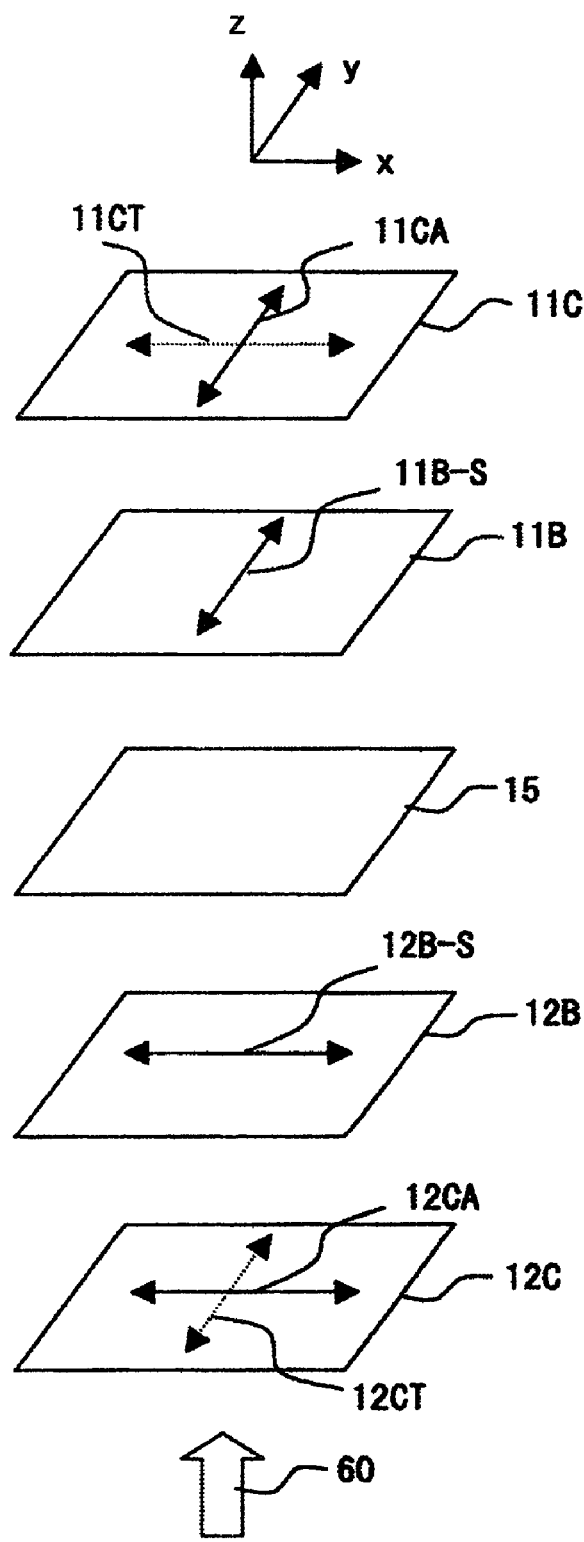
FIG. 8 is an optical configuration diagram for the liquid crystal display device of this invention.
Figure 9A:
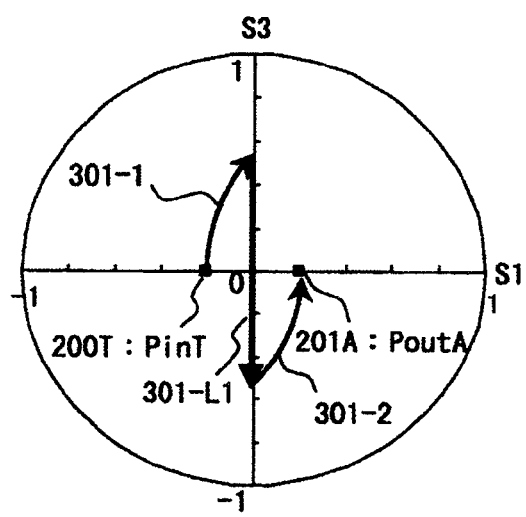
FIG. 9A is a Poincare sphere representation for explanation of the liquid crystal display device of this invention.
Figure 9B:
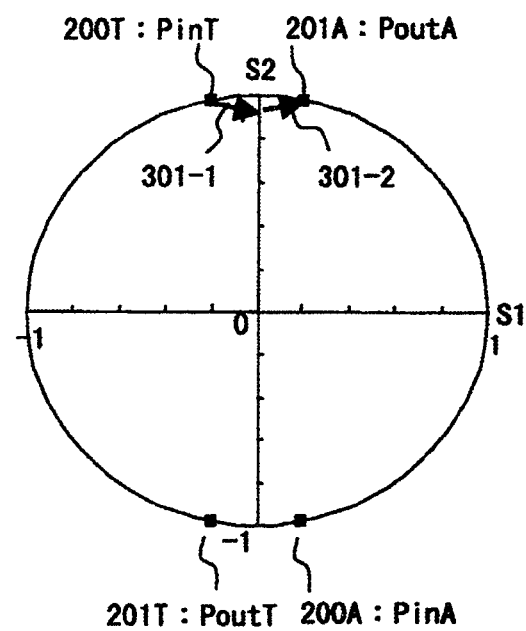
FIG. 9B is a Poincare sphere representation for explanation of the liquid crystal display device of this invention.
Figure 16:
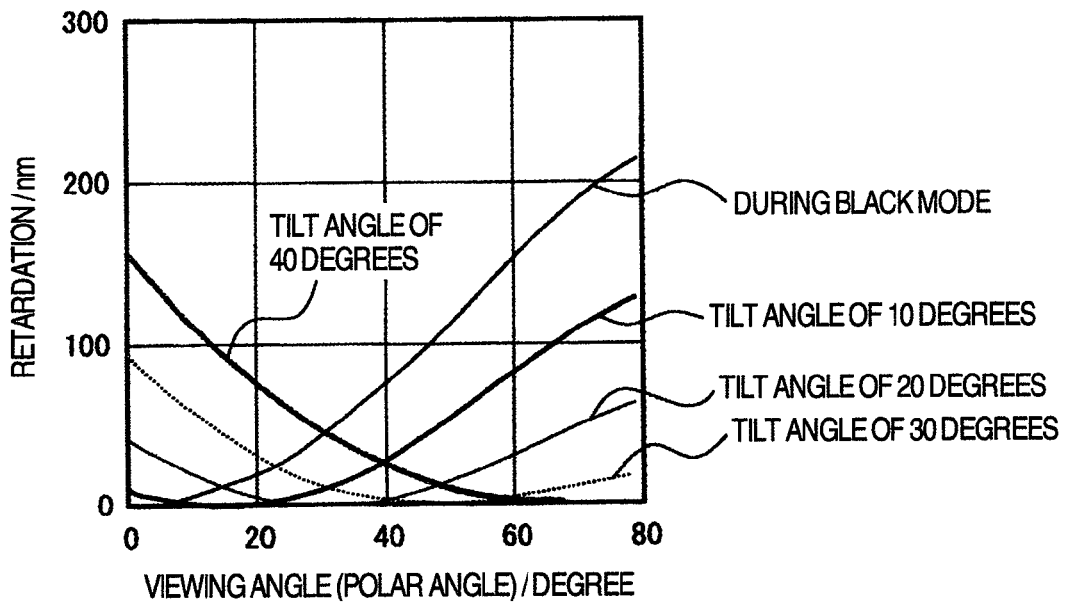
FIG. 16 is a characteristic diagram for explanation of characteristics of the liquid crystal display device of this invention.
Figure 17:
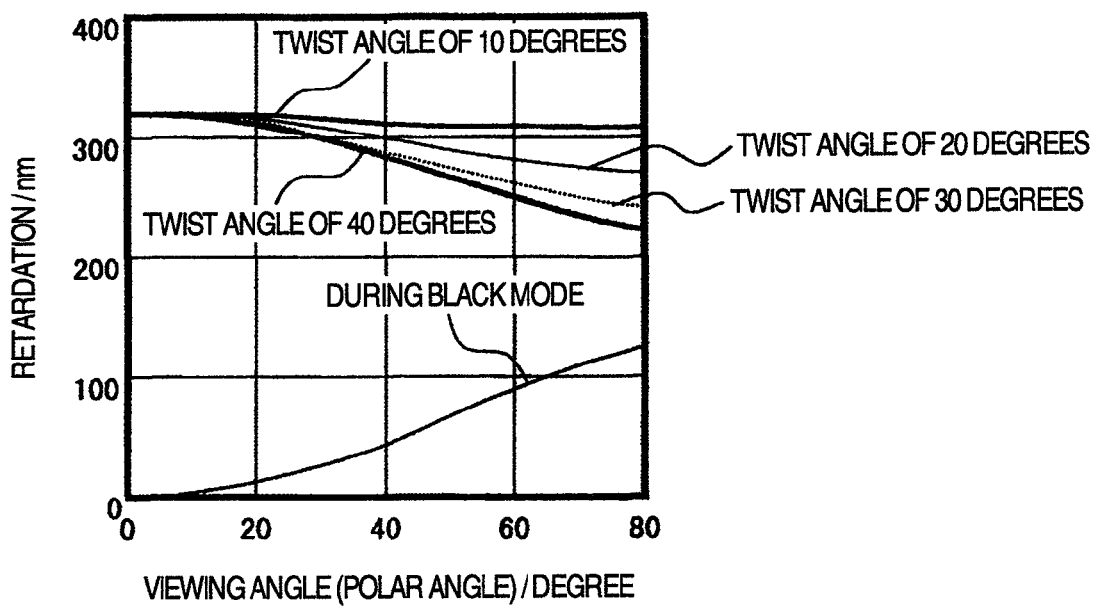
FIG. 17 is a characteristic diagram for explanation of characteristics of the liquid crystal display device of this invention.

In this case, the black mode is considered to be equivalent to the common VA method. However, since the liquid crystal layer is formed of bent type liquid crystal molecules, display modes other than the black mode differ greatly from the common VA method. In the general VA method, a tilt angle (polar angle) of the liquid crystal molecules with respect to the substrate is controlled by applying an electric field perpendicular to the substrate to induce retardation when the display device is seen from the front. However, this method makes the viewing angle dependency of the retardation very large. This viewing angle dependency varies greatly depending on grayscale level. FIG. 16 shows retardation characteristics determined by an approximation assuming that liquid crystal molecules are tilted uniformly from the black mode state toward the azimuth angle of 45 degrees. An abscissa represents a viewing angle (polar angle) when the liquid crystal layer is viewed from the azimuth angle of 45 degrees and an ordinate represents retardation. That is, FIG. 16 shows a viewing angle (polar angle) dependency of retardation when the liquid crystal layer is viewed from the azimuth angle of 45 degrees. An inclination angle with respect to the normal of the substrate is taken as a tilt angle of the liquid crystal and the retardation characteristics are shown for tilt angles of 10, 20, 30 and 40 degrees during black mode. This diagram shows that a so-called γ characteristics changes greatly depending on the viewing angle. In a liquid crystal display device applying a two-dimensional, optically isotropic liquid crystal layer formed of bent type liquid crystal molecules, it is possible to induce retardation when the display device is viewed from the front by applying an in-plane electric field to the substrate and thereby controlling the twist angle (azimuth angle) of the liquid crystal molecules with respect to the substrate. A result of approximation of the viewing angle dependency of the liquid crystal layer retardation is shown in FIG. 17. This figure also takes the azimuth angle of 45 degrees as an observation direction (viewing angle), as in FIG. 16. When compared to FIG. 16, FIG. 17 shows that the viewing angle dependency is almost the same during black mode but that in other than the black mode, the viewing angle dependency of the retardation is small and a change in viewing angle dependency caused by the liquid crystal twist angle is also small. Therefore, this method makes it possible to suppress the viewing angle dependency of the γ characteristics. By combining the above liquid crystal control method and the technique of this invention for improving the viewing angle performance during black mode, a liquid crystal display device can be realized which has a black mode display performance equivalent to that of VA method and also a viewing angle performance equivalent to that of IPS method.

Where the liquid crystal layer in black mode satisfies nx=ny≧nz, if an ideal polarization state change is to be produced in the construction of FIG. 1, the Nz coefficients of the polarization plate support members 11B and 12B need to be not larger than at least 1 and the optical configuration of FIG. 8 needs to be satisfied. As shown in the figure, the retarded phase axes 11B-S, 12B-S in a substrate parallel plane of the polarization plate support members 11B and 12B must be parallel with the adjoining polarization layer absorbing axes 11CA, 12CA. However, considering the fact that the transmissivity obtained during white mode when viewed from the front is sufficiently high and that differences among refractive indices nx, ny, nz of the liquid crystal layer are approximately 0.1 at the largest, the Nz coefficients of the polarization plate support members 11B and 12B are generally considered to be not larger than 0. In this case, the polarization state change is as shown in FIG. 9.

In FIG. 6 or FIG. 8, when the Nz coefficient of one of the polarization plate support members 11B and 12B is large enough in absolute value, the support member has a c-plate birefringence that cancels retardation generated in the liquid crystal layer at an oblique viewing angle. So, the retarded phase axis in the substrate parallel plane does not needs to be determined. For example, if the polarization plate support member 12B in FIG. 6 is not a perfect c-plate but has an Nz coefficient of 5 or larger in absolute value, the effects of this invention can be produced to a satisfactory level. It should be noted, however, that to reduce the front brightness in black mode, the in-plane retarded phase axis of the support member 12B should preferably match the x direction or y direction. The birefringence and axis arrangement of the support member 11B are determined as follows according to the birefringence of the liquid crystal layer.

Figure 10:
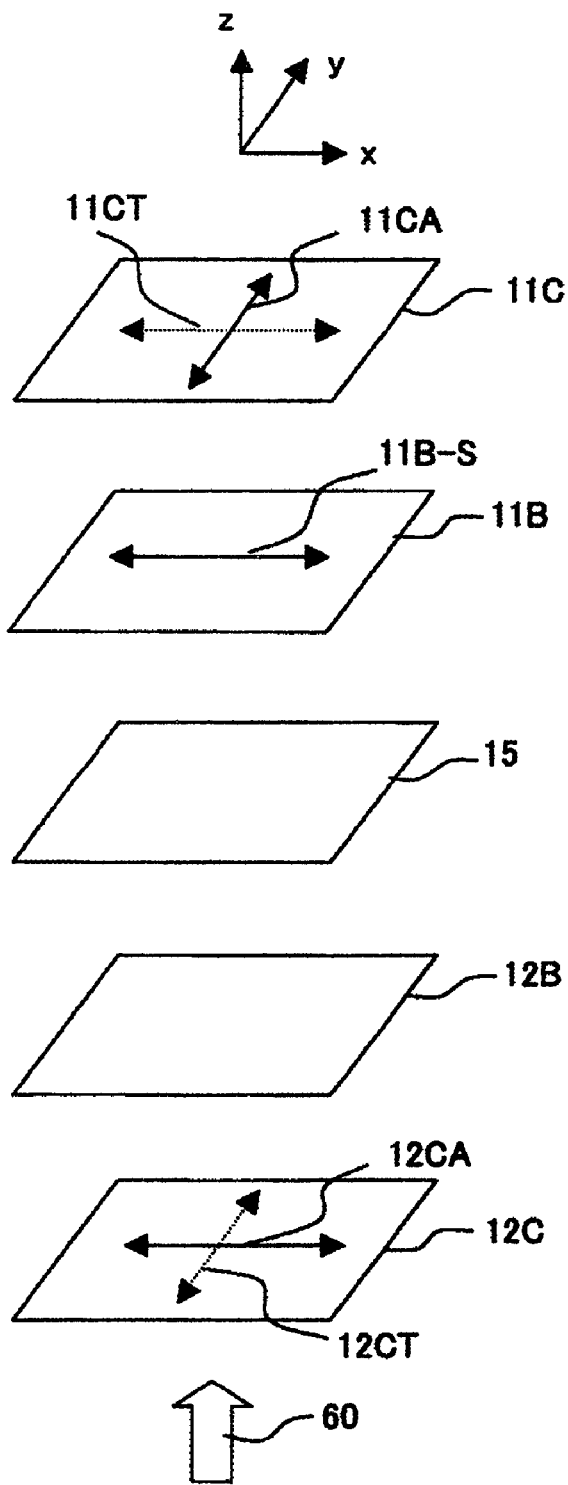
FIG. 10 is an optical configuration diagram for the liquid crystal display device of this invention.
Figure 11A:
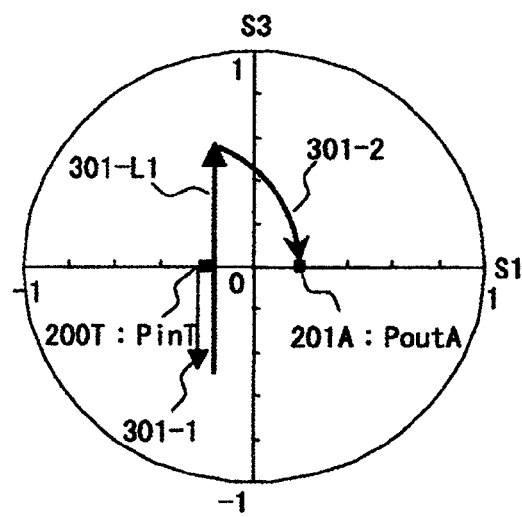
FIG. 11A is a Poincare sphere representation for explanation of the liquid crystal display device of this invention.
Figure 11B:
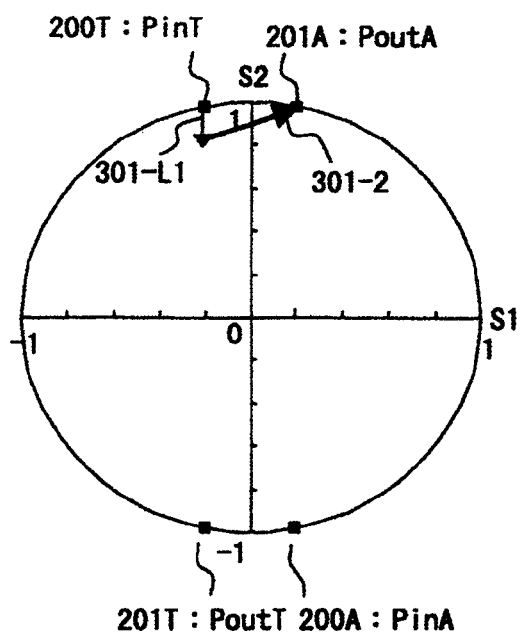
FIG. 11B is a Poincare sphere representation for explanation of the liquid crystal display device of this invention.

If the liquid crystal layer in black mode satisfies nz≧nx=ny, the optical configuration is as shown in FIG. 10. The polarization plate support member 12B has a negative c-plate birefringence that satisfies nx=ny≧nz, and thus the Nz coefficient of the polarization plate support member 11B needs to be 1 or larger. The polarization state change is as shown in FIG. 11, which is nearly an ideal polarization state change. In this case, forming the polarization plate support member 12B from a common TAC (triacetylcellulose) film and the polarization plate support member 11B from a positive a-plate can minimize the cost.

Figure 12:
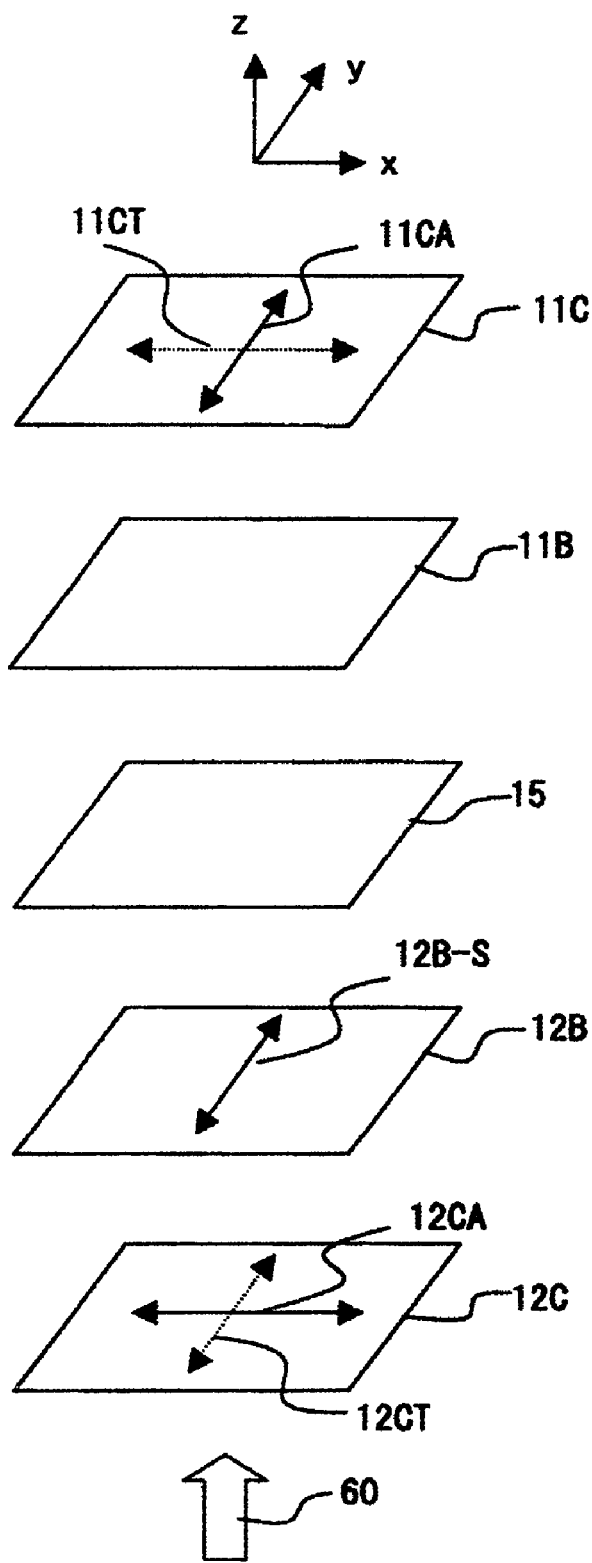
FIG. 12 is an optical configuration diagram for the liquid crystal display device of this invention.

As shown in FIG. 12, the equivalent polarization state change can be obtained by making 11B a negative c-plate and making 12B to have an Nz coefficient of not less than 1.

Figure 13:
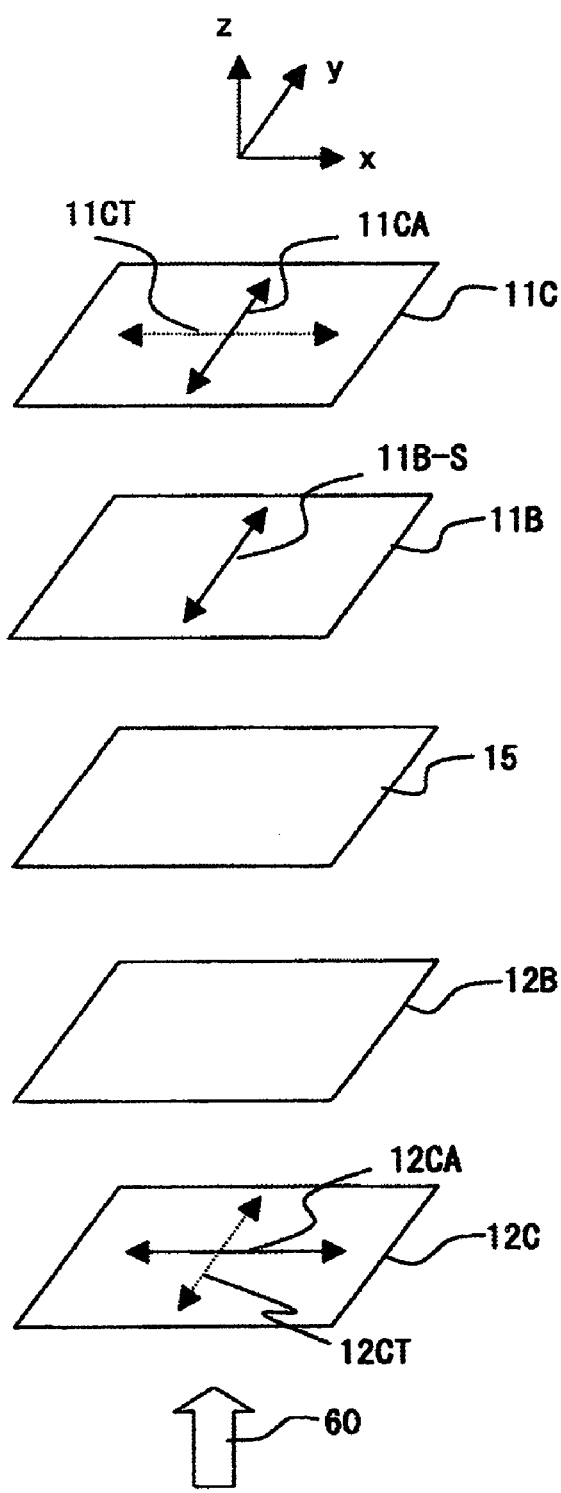
FIG. 13 is an optical configuration diagram for the liquid crystal display device of this invention.
Figure 14A:
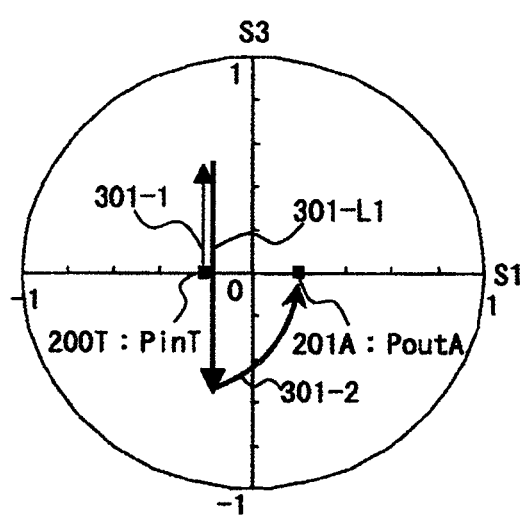
FIG. 14A is a Poincare sphere representation for explanation of the liquid crystal display device of this invention.
Figure 14B:
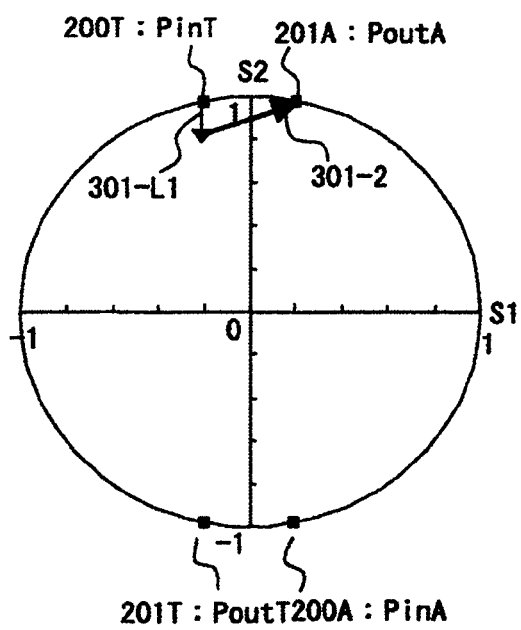
FIG. 14B is a Poincare sphere representation for explanation of the liquid crystal display device of this invention.

If the liquid crystal layer in black mode satisfies nx=ny≧nz, the optical configuration is as shown in FIG. 13. The polarization plate support member 12B has a positive c-plate birefringence that meets nz≧nx=ny and therefore the Nz coefficient of the polarization plate support member 11B must be not larger than 0. The polarization state change is as shown in FIGS. 14A and 14B, which is nearly an ideal polarization state change.

Figure 15:
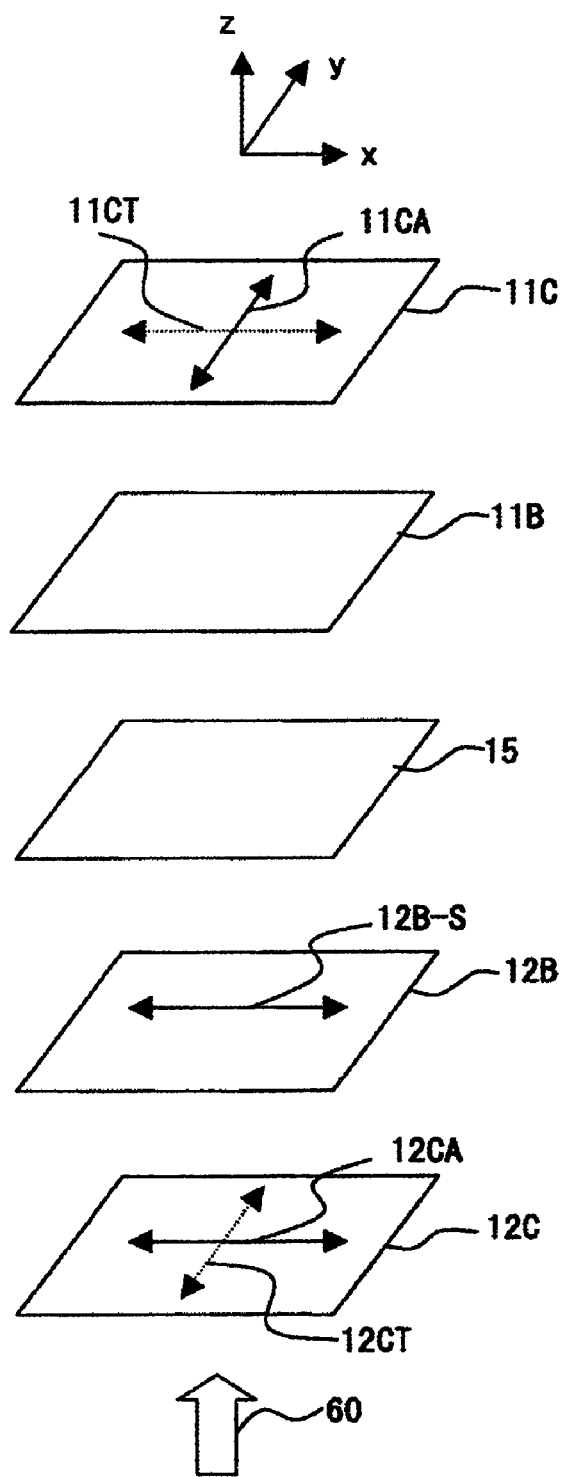
FIG. 15 is an optical configuration diagram for the liquid crystal display device of this invention.

As shown in FIG. 15, the equivalent polarization state change can also be produced by making 11B a positive c-plate and making 12B to have an Nz coefficient of not larger than 0.

Now, example embodiments will be shown below for further detailed explanation of the present invention. The embodiments that follow are given by way of example only and are not in any way intended to limit the present invention. The embodiments include a result of study that performed numerical calculations based on an optical simulation using a 44-matrix method disclosed in D. W. Berreman, "Optical in Stratified and Anisotropic Media: 4×4-Matrix Formulation" J. Opt. Soc. Am. vol. 62, No. 4, pp. 502-510, 1972. In the simulation, we used spectral characteristics of 3-wavelength cold cathode tubes used in common backlights, spectral transmission characteristics of R, G, B color filters and spectral characteristics of 1224DU of Nitto Denko as the polarization layer of the polarization plate. For chromatic dispersion of the optical phase compensation film, polycarbonate (PC), polystyrene and norbornene-type materials were used. Other materials may of course be used.

In the following embodiments, the words "vertical" and "90°" do not mean "perfectly vertical". The essence of the words is not affected if they are replaced with "almost vertical" or "88-90° in a smaller angle". The same also applies to the word "parallel".

Further, since in the embodiments a current general configuration is described, it is assumed that one birefringence function is realized for a single optical phase compensation film. However, the birefringence of each optical phase compensation film shown in the embodiments may also be realized by a combination of a plurality of optical phase compensation films. The optical phase compensation film and the polarization layer may be formed by coating a material on a substrate and performing an alignment layer treatment. In that case, however, the configuration shown in the embodiments may change. More specifically, there is a possibility that the polarization layer may be arranged on the liquid crystal layer side of the substrate. The polarization plate support member arranged on the side opposite to the liquid crystal layer shown in the embodiments refers to the substrate, over which the polarization layer is formed, or all members formed between the substrate and the polarization layer. The polarization plate support member arranged on the liquid crystal layer side shown in the embodiments refers to nonexistent members or members that are formed between the polarization layer and the optical phase compensation film formed by coating. The present invention puts emphasis on the optical configuration and if the optical configuration disclosed in this invention is realized, the effect of this invention can be realized irrespective of its physical configuration.

Embodiment 1

Figure 18:
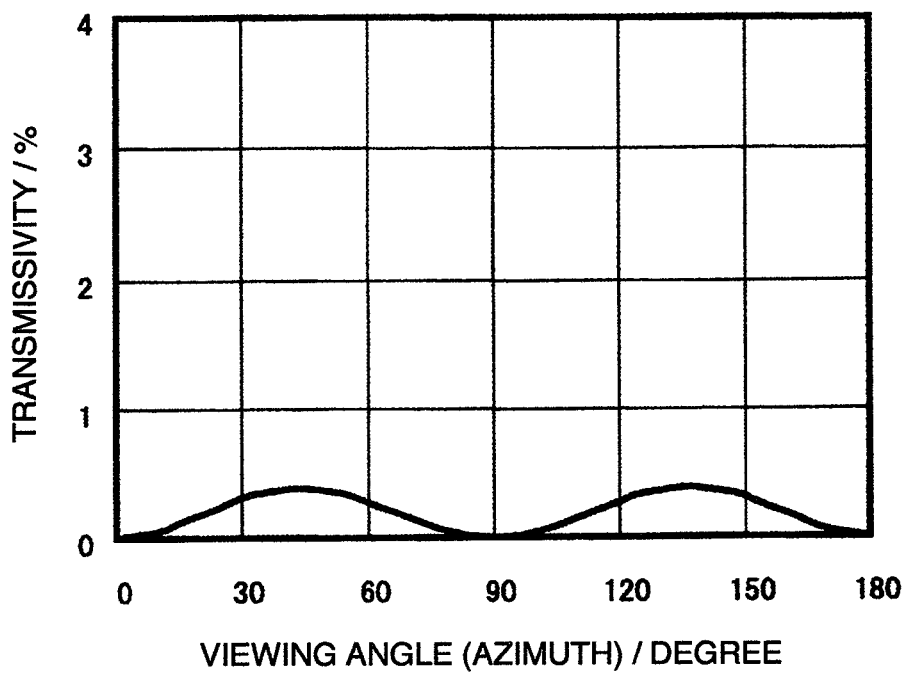
FIG. 18 is a characteristic diagram for explanation of effects of this invention.

A structure of this embodiment is shown in FIG. 1 and its optical configuration in FIG. 6. When long axes of bent type liquid crystal molecules in a substrate parallel plane are aligned uniformly in an x direction, refractive indices in principal axis directions are nx=1.58, ny=1.5 and nz=1.6. The liquid crystal layer is 4.0 μm thick. The polarization plate support member 12B is formed of norbornene-type resin and has an Nz coefficient of 3.0 and a retardation of 30 nm when viewed from the front. The polarization plate support member 11B is formed of norbornene-type resin and has an Nz coefficient of 4.0 and a retardation of 40 nm when viewed from the front. During black mode, the liquid crystal layer has a uniform refractive index in the substrate parallel surface of (nx+ny)/2=1.54 and a refractive index in substrate normal direction of nz=1.6. These calculation results are shown in FIG. 18. The abscissa represents a viewing angle (azimuth angle) at a polar angle of 60 degrees in black mode, and the ordinate represents transmissivity. That is, FIG. 18 shows a viewing angle (azimuth angle) dependency of the transmissivity in black mode at a polar angle of 60 degrees.

Figure 19:
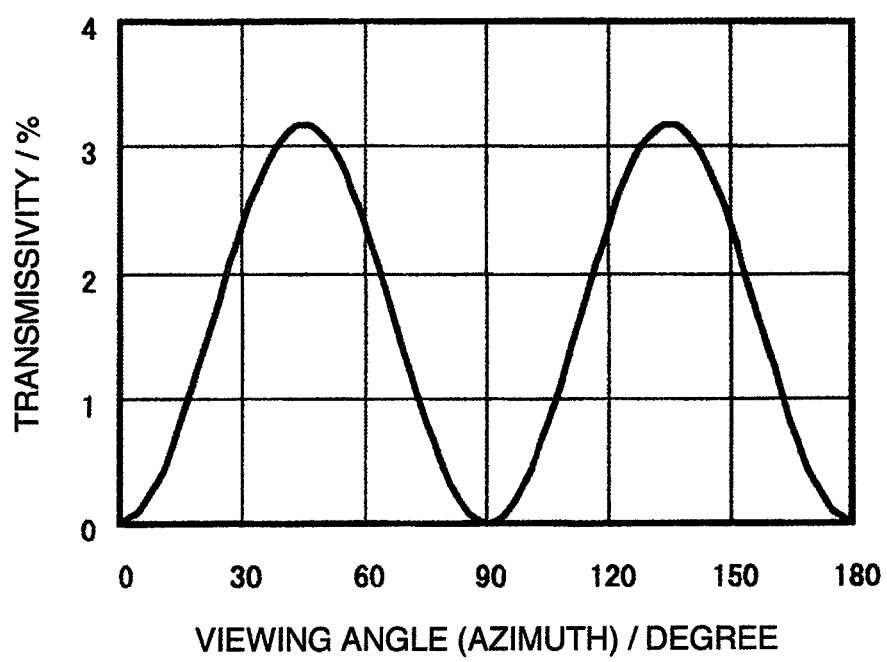
FIG. 19 is a characteristic diagram for explanation of effects of this invention.
Figure 20:
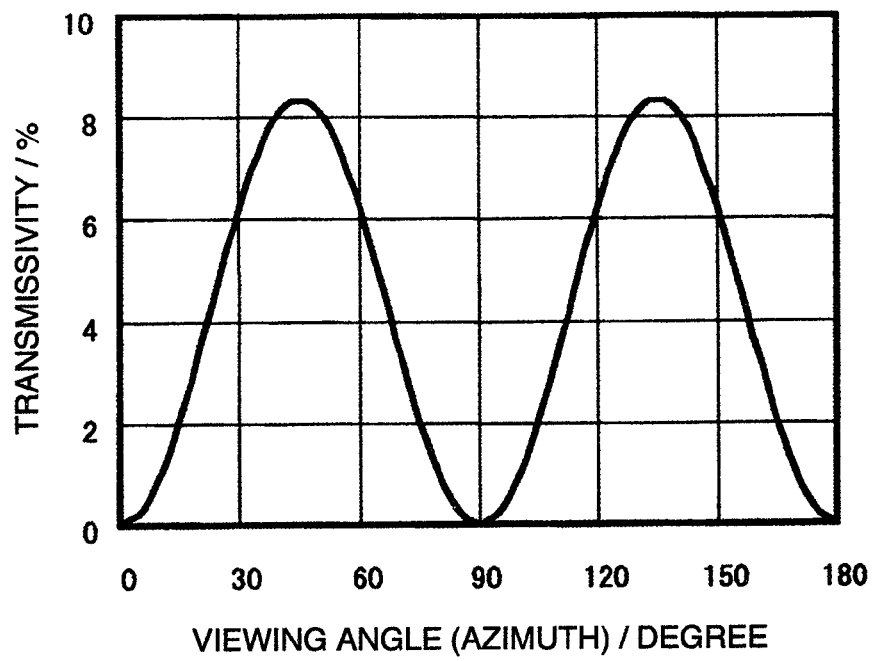
FIG. 20 is a characteristic diagram for explanation of effects of this invention.

For comparison, a case of a polarization plate support member using a common TAC film is shown in FIG. 19 and a case of a polarization plate support member using an optically isotropic medium is shown in FIG. 20. A way of representation is similar to that of FIG. 18. The use of a TAC film with a greater Nz coefficient as the polarization plate support members 11B and 12B results in a better black mode display performance than when an optically isotropic medium is used. Further, the construction of this embodiment is shown to improve the viewing angle performance during black mode.

Embodiment 2

Figure 21:
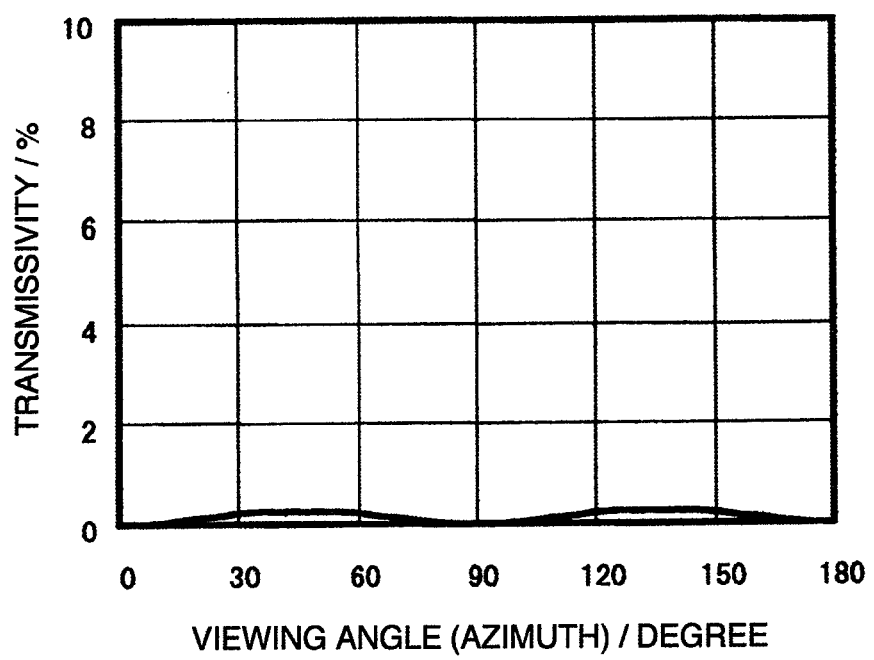
FIG. 21 is a characteristic diagram for explanation of effects of this invention.

The construction of this embodiment is shown in FIG. 1 and its optical configuration in FIG. 6. When the long axes of the bent type liquid crystal molecules in the substrate parallel plane are uniformly aligned in the x direction, refractive indices in the principal axis directions are nx=1.58, ny=1.5 and nz=1.6, respectively. The liquid crystal layer is 4.0 μm thick. In this embodiment, the polarization plate support members 11B and 12B commonly use norbornene-type resin and have an Nz coefficient of 3.0 and a retardation in the front direction of 40 nm. A viewing angle dependency of the transmissivity at a viewing angle (polar angle) of 60 degrees in black mode is shown in FIG. 21.

Embodiment 3

Figure 22:
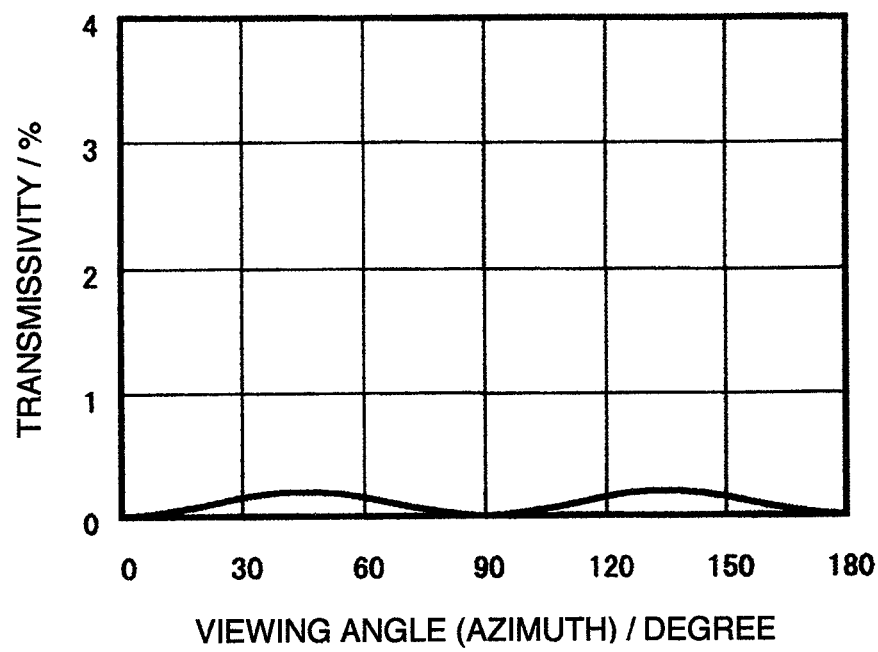
FIG. 22 is a characteristic diagram for explanation of effects of this invention.

The construction of this embodiment is shown in FIG. 1 and its optical configuration in FIG. 8. When the long axes of the bent type liquid crystal molecules in the substrate parallel plane are uniformly aligned in the x direction, refractive indices in the principal axis directions are nx=1.6, ny=1.52 and nz=1.51, respectively. The liquid crystal layer is 4.0 μm thick. In this embodiment, the polarization plate support members 11B and 12B commonly use polycarbonate resin and have an Nz coefficient of −1.0 and a retardation in the front direction of 50 nm. A viewing angle dependency of the transmissivity at a viewing angle (polar angle) of 60 degrees in black mode is shown in FIG. 22.

Embodiment 4

Figure 23:
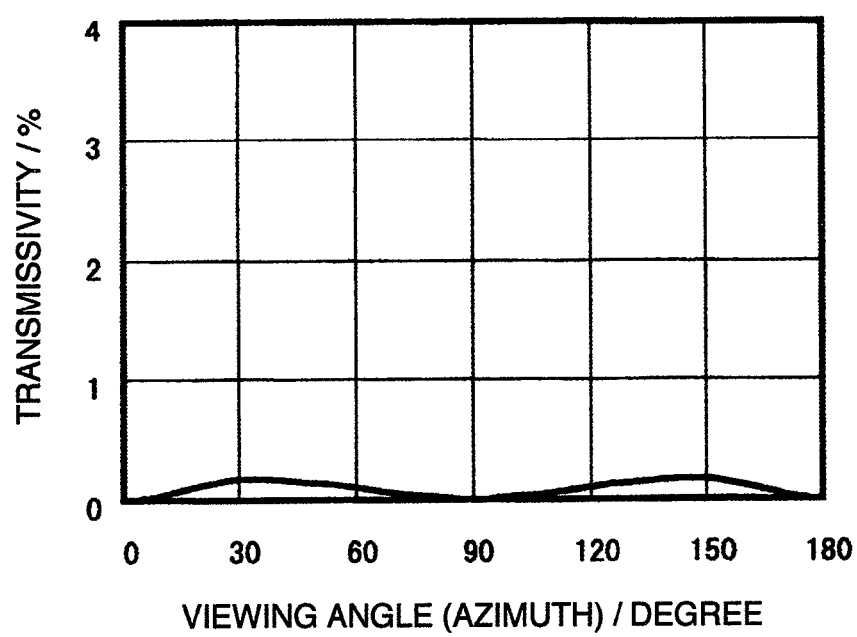
FIG. 23 is a characteristic diagram for explanation of effects of this invention.

The construction of this embodiment is shown in FIG. 1 and its optical configuration in FIG. 12. When the long axes of the bent type liquid crystal molecules in the substrate parallel plane are uniformly aligned in the x direction, refractive indices in the principal axis directions are nx=1.58, ny=1.5 and nz=1.6, respectively. The liquid crystal layer is 4.0 μm thick. In this embodiment, the polarization plate support members 11B and 12B use norbornene-type resin and have Nz coefficients of 1.0 and 5.0 respectively and a retardation in the front direction of 50 nm. The retarded phase axis in the substrate parallel plane of the polarization plate support member 11B is parallel with the absorbing axis 11CA of the adjoining second polarization layer 11C. A viewing angle dependency of the transmissivity at a viewing angle (polar angle) of 60 degrees in black mode is shown in FIG. 23. Since the Nz coefficient of the polarization plate support member 11B is large enough in absolute value, it is seen that, unlike FIG. 6, the brightness of the liquid crystal layer in black mode when viewed at an oblique viewing angle is reduced even if the retarded phase axis in the substrate parallel plane is parallel to the absorbing axis of the adjoining polarization layer.

Embodiment 5

Figure 24:
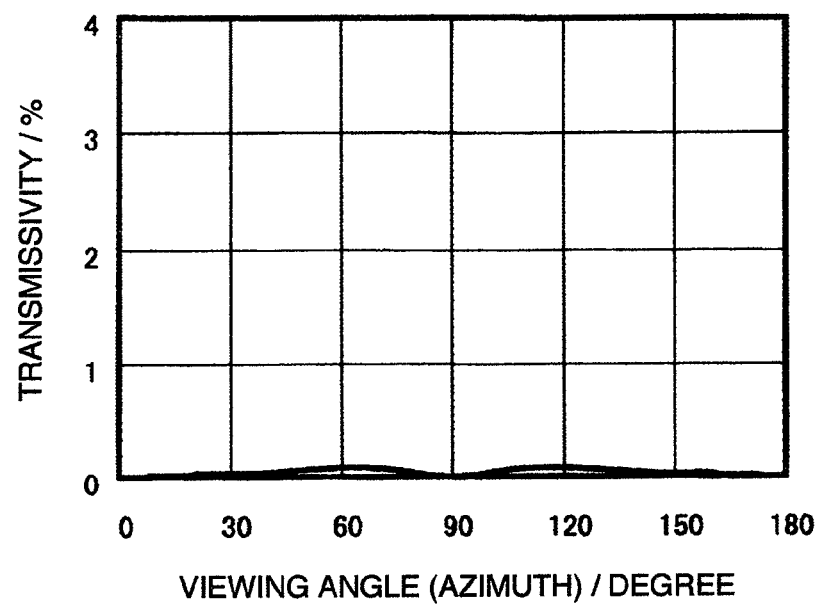
FIG. 24 is a characteristic diagram for explanation of effects of this invention.

The construction of this embodiment is shown in FIG. 1 and its optical configuration in FIG. 13. When the long axes of the bent type liquid crystal molecules in the substrate parallel plane are uniformly aligned in the x direction, refractive indices in the principal axis directions are nx=1.6, ny=1.52 and nz=1.51, respectively. The liquid crystal layer is 4.0 μm thick. In this embodiment, the polarization plate support member 11B uses polycarbonate resin and the polarization plate support member 12B uses norbornene-type resin. The polarization plate support members 11B and 12B have Nz coefficients of −5.0 and 0.0 respectively. The retarded phase axis in the substrate parallel plane of the polarization plate support member 12B is perpendicular to the absorbing axis 12CA of the adjoining first polarization layer 12C. A viewing angle dependency of the transmissivity at a viewing angle (polar angle) of 60 degrees in black mode is shown in FIG. 24. Since the Nz coefficient of the polarization plate support member 12B is large enough in absolute value, it is seen that, unlike FIG. 8, the brightness of the liquid crystal layer in black mode when viewed at an oblique viewing angle is reduced even if the retarded phase axis in the substrate parallel plane is perpendicular to the absorbing axis of the adjoining polarization layer.

Embodiment 6

Figure 25:
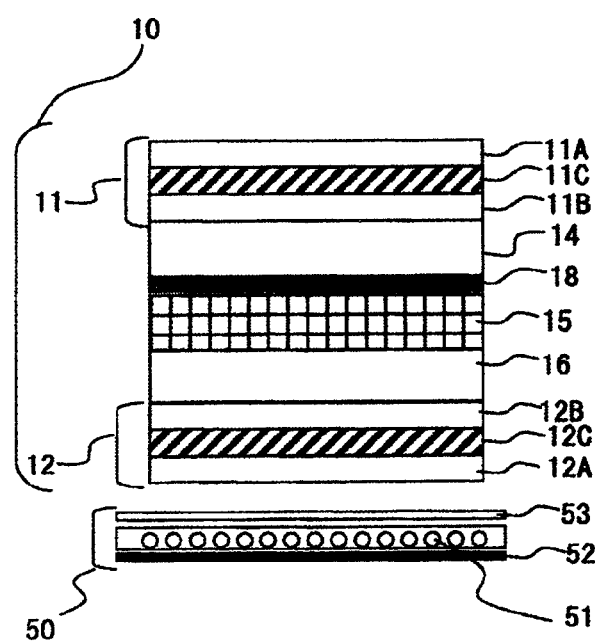
FIG. 25 shows a construction of a liquid crystal display device as one embodiment of this invention.
Figure 26:
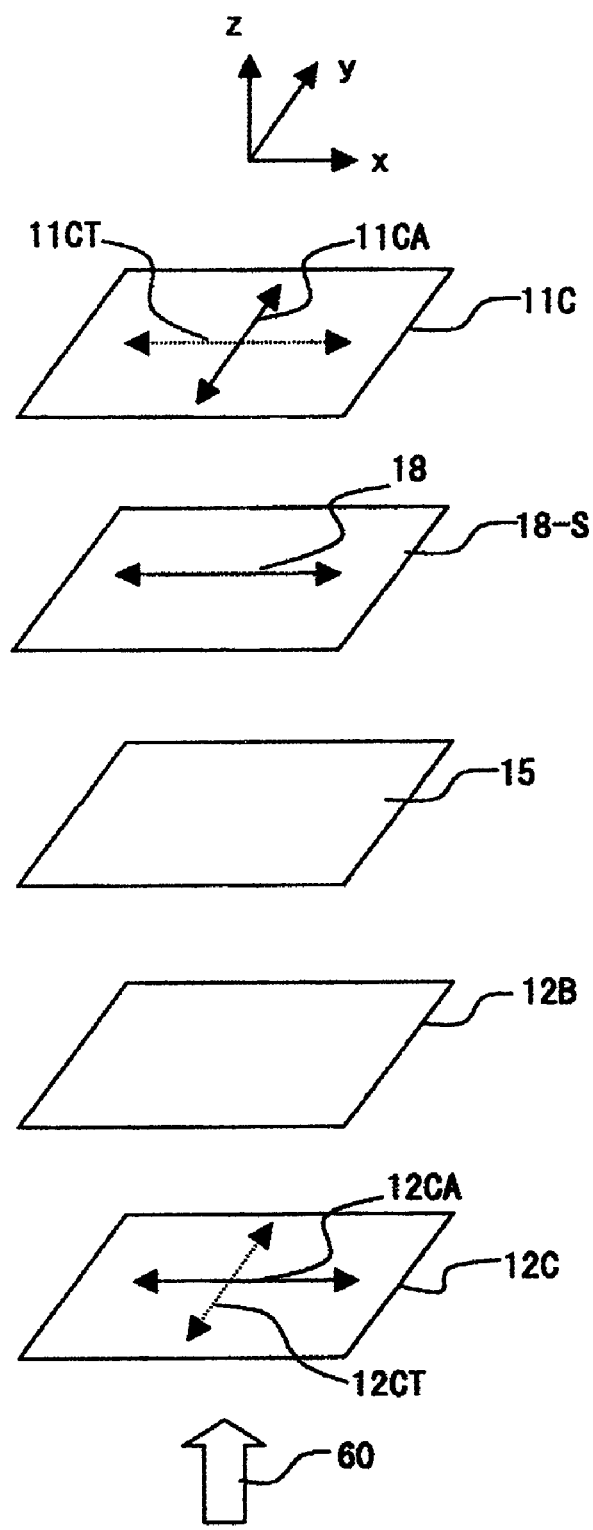
FIG. 26 is an optical configuration diagram for the liquid crystal display device of this invention.
Figure 27:
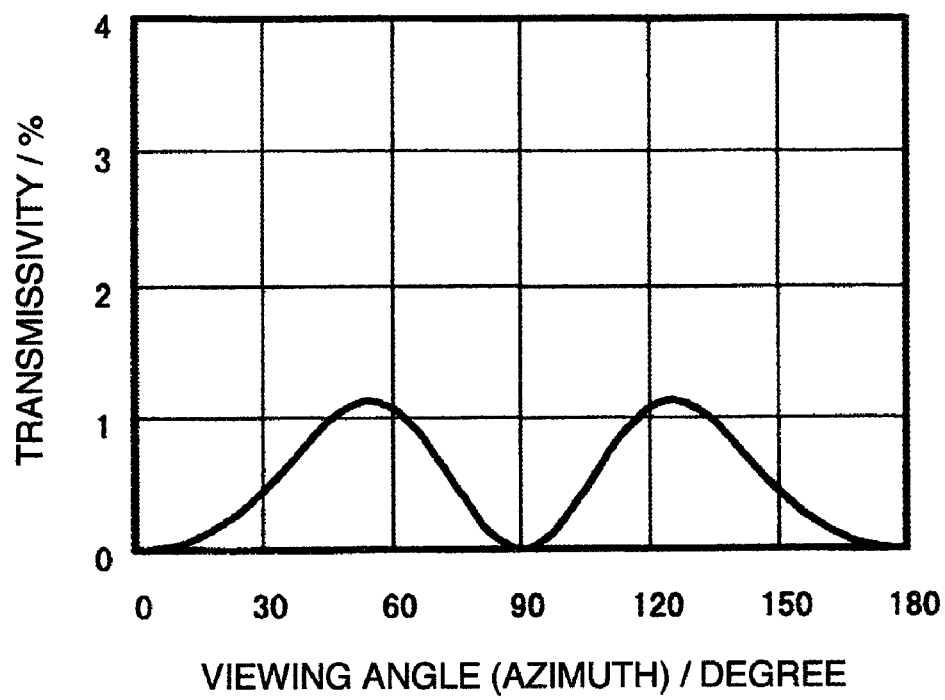
FIG. 27 is a characteristic diagram for explanation of effects of this invention.

The construction of this embodiment is shown in FIG. 25 and its optical configuration in FIG. 26.

The construction of FIG. 25 differs from that of FIG. 1 in that a birefringent medium 18 formed by a coating method is disposed between the liquid crystal layer 15 and the second substrate 14.

When the long axes of the bent type liquid crystal molecules in the substrate parallel plane are uniformly aligned in the x direction, refractive indices in the principal axis directions are nx=1.58, ny=1.5 and nz=1.6, respectively. The liquid crystal layer is 4.0 μm thick. In this embodiment, the polarization plate support member 11B uses a popular TAC film and the polarization plate support member 12B uses an optically isotropic film. The birefringent medium 18 is disposed on the liquid crystal layer 15 side of the second substrate 14 and formed by coating. This thin film has an Nz coefficient of 1.0 and a retardation in the front direction of 130 nm. A viewing angle dependency of the transmissivity at a viewing angle (polar angle) of 60 degrees in black mode is shown in FIG. 26.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A liquid crystal display device comprising:
a first substrate having a first polarization layer on a light incident side of the liquid crystal display device;

a second substrate having a second polarization layer on a light outgoing side of the liquid crystal display device;
a liquid crystal layer disposed between said first substrate and said second substrate;
a first birefringent medium disposed between said first polarization layer and said liquid crystal layer;
a second birefringent medium disposed between second polarization layer and said liquid crystal layer; and
a pixel electrode and a common electrode arranged on one of said first substrate and said second substrate,
wherein an absorbing axis of said first polarization layer and an absorbing axis of said second polarization layer form an angle of from 88 degrees to 92 degrees;
wherein said liquid crystal layer has a property that, when no electric field is applied between said pixel electrode and said common electrode, said liquid crystal layer is optically isotropic in-plane of said liquid crystal layer and that, when an electric field is applied between said pixel electrode and said common electrode, an in-plane refractive index anisotropy is induced in said liquid crystal layer;
wherein said liquid crystal layer, when no electric field is applied, has a larger refractive index in a direction parallel to said first and second substrates than a refractive index in a direction perpendicular to said first and second substrates;
wherein said first birefringent medium has an Nz coefficient of not larger than $-5$;
wherein said second birefringent medium has an Nz coefficient of not larger than 0; and
wherein a retarded phase axis in a plane parallel to said first and second substrates forms an angle of from 88 degrees to 92 degrees with the absorbing axis of said polarization layer.

2. A liquid crystal display device according to claim 1, wherein said first polarization layer and said first birefringent medium form said first polarization plate; and
wherein said second polarization layer and said second birefringent medium form a second polarization plate.

3. A liquid crystal display device according to claim 1, wherein said first birefringent medium comprises a positive c-plate.

4. A liquid crystal display device according to claim 1, wherein said pixel electrode and said common electrode are arranged on said first substrate; and
wherein said pixel electrode and said common electrode are both formed in a comb shape.

5. A liquid crystal display device according to claim 1, wherein said pixel electrode and said common electrode are arranged on said first substrate; and
wherein one of said pixel electrode and said common electrode is formed in a comb shape and the other is formed in a tabular shape.

6. A liquid crystal display device according to claim 1,
wherein said first birefringent medium disposed between said first polarization layer and said liquid crystal layer is a single plate, and
wherein said second birefringent medium disposed between said second polarization layer and said liquid crystal layer is a single plate.

* * * * *